US011221604B2

(12) United States Patent
Wenus et al.

(10) Patent No.: US 11,221,604 B2
(45) Date of Patent: Jan. 11, 2022

(54) SPLIT STRUCTURE DESIGN FOR AN INTERNET OF THINGS DEVICE

(71) Applicant: Intel Corporation, Santa Clara, CA (US)

(72) Inventors: Jakub Wenus, Maynooth (IE); Cliodhna Ni Scanaill, Broadford (IE); Keith Nolan, Mullingar (IE); Niall Cahill, Galway (IE); Wael Guibene, Lexlip (IE); Mark Kelly, Leixlip (IE)

(73) Assignee: Intel Corporaion, Santa Clara, CA (US)

( * ) Notice: Subject to any disclaimer, the term of this patent is extended or adjusted under 35 U.S.C. 154(b) by 813 days.

(21) Appl. No.: 15/085,284

(22) Filed: Mar. 30, 2016

(65) Prior Publication Data

US 2017/0285595 A1 Oct. 5, 2017

(51) Int. Cl.
| G05B 19/00 | (2006.01) |
| G05B 19/042 | (2006.01) |
| G06F 9/4401 | (2018.01) |
| G06F 1/26 | (2006.01) |

(52) U.S. Cl.
CPC ......... *G05B 19/042* (2013.01); *G06F 1/26* (2013.01); *G06F 9/4401* (2013.01); *G05B 2219/25011* (2013.01)

(58) Field of Classification Search
CPC ...... H02J 7/02; H02J 7/04; H02J 7/025; H02J 17/00; H02M 7/537; H04B 10/00
See application file for complete search history.

(56) References Cited

U.S. PATENT DOCUMENTS

| 6,104,512 A * | 8/2000 | Batey, Jr. ............ H04B 10/1143 340/7.54 |
| 2002/0060646 A1* | 5/2002 | Petros .................. H01Q 1/1285 343/713 |
| 2006/0062515 A1* | 3/2006 | Mahbobi .............. H04B 10/801 385/24 |
| 2009/0325625 A1 | 12/2009 | Hugl et al. |
| 2011/0148218 A1* | 6/2011 | Rozbicki ............... H02J 7/0068 307/104 |

(Continued)

FOREIGN PATENT DOCUMENTS

| KR | 20120130897 A | 12/2012 |
| WO | WO-2017172088 A1 | 10/2017 |

OTHER PUBLICATIONS

PCT International Search Report, PCT Application No. PCT/US2017/017956, dated May 18, 2017, 3 pages.

(Continued)

*Primary Examiner* — Dong-Chang Shiue
(74) *Attorney, Agent, or Firm* — Schwegman Lundberg & Woessner, P.A.

(57) ABSTRACT

A split structure design for an internet of things (IoT) device including a control IoT device (CID) and a sensor IoT device (SID). An example of an apparatus provides a CID including a power transmitter to power a SID through a barrier and a control data transceiver to communicate with the SID through the barrier. The CID includes a power adjustor to increase a power transmission to the SID in steps, and an intermodule communicator to determine if communications have been established with the sensor IoT, and, if not, instruct the power adjustor to increase the power transmission to the SID by a step.

35 Claims, 9 Drawing Sheets

(56) References Cited

U.S. PATENT DOCUMENTS

| | | | |
|---|---|---|---|
| 2011/0313695 A1* | 12/2011 | Houston | G01R 21/133 |
| | | | 702/62 |
| 2012/0213098 A1 | 8/2012 | Sun | |
| 2015/0121470 A1 | 4/2015 | Rongo et al. | |
| 2016/0118834 A1* | 4/2016 | Swope | H02J 7/00034 |
| | | | 320/108 |
| 2016/0190853 A1* | 6/2016 | Yow | H02J 50/10 |
| | | | 320/108 |
| 2016/0286489 A1* | 9/2016 | Liu | H04L 12/10 |
| 2017/0066334 A1* | 3/2017 | Sindia | H02J 7/007188 |
| 2018/0138744 A1* | 5/2018 | Lagnado | H02J 7/025 |

OTHER PUBLICATIONS

"International Application Serial No. PCT/US2017/017956, International Preliminary Report on Patentability dated Oct. 11, 2018", 12 pgs.

"International Application Serial No. PCT/US2017/017956, Written Opinion dated May 18, 2017", 10 pgs.

\* cited by examiner

600

700

SPLIT STRUCTURE DESIGN FOR AN INTERNET OF THINGS DEVICE

TECHNICAL FIELD

The present techniques relate generally to Internet of Things (IoT) devices. More specifically the present techniques relate to devices that can communicate with and power a sensor through a surface.

BACKGROUND

It has been estimated that the Internet of Things (IoT) may bring Internet connectivity to 50 billion devices by 2020. Internet of Things (IoT) devices are often deployed in harsh environments that have difficulty with access for cables and electrical connections. This may complicate deployment for applications such as motion sensors, weather sensors, and the like.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
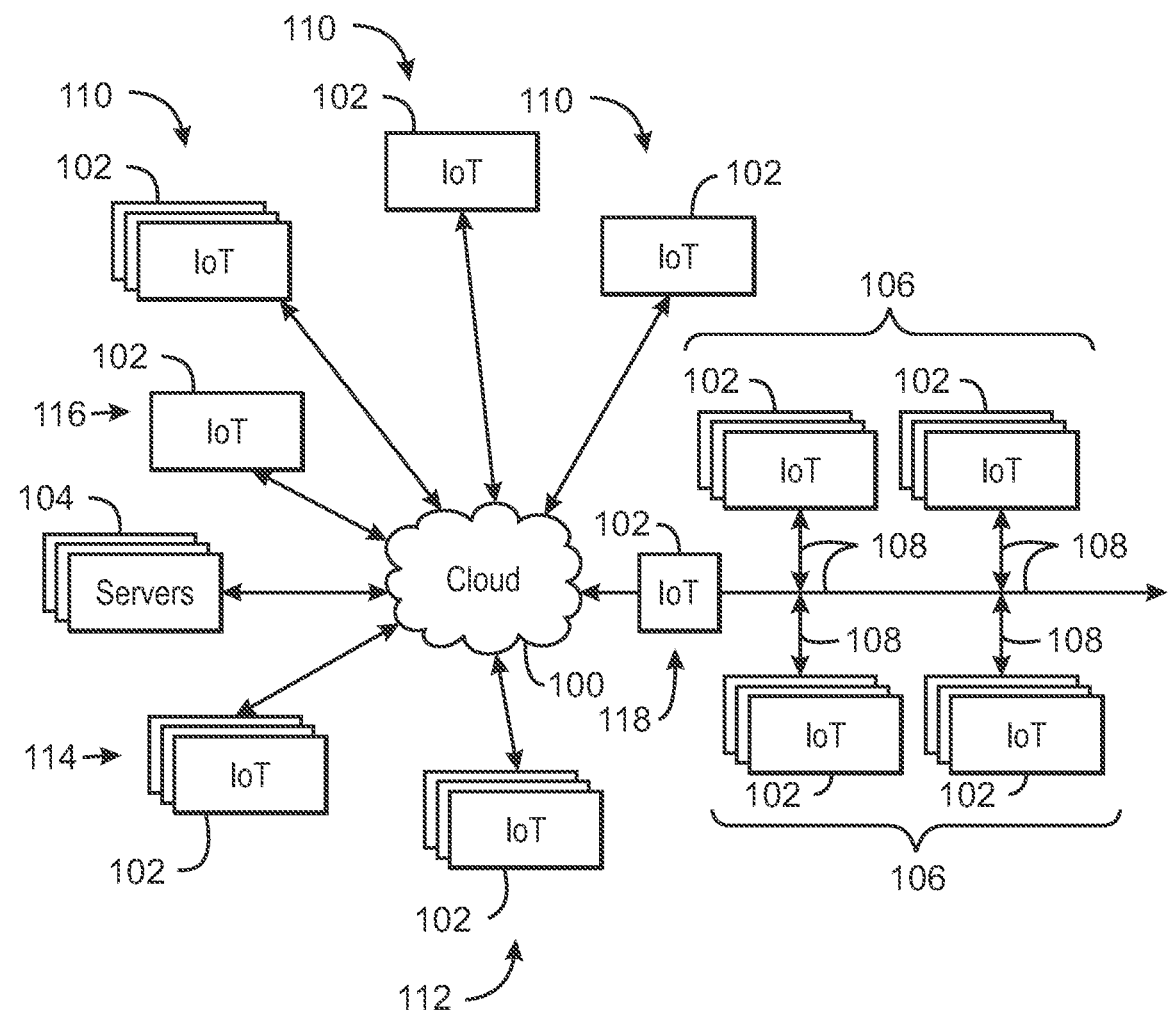
FIG. 1 is a drawing of a cloud computing network, or cloud, in communication with a number of Internet of Things (IoT) devices, at least some of which are communicating with servers.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, home weather stations, light switches, thermostats, locks, cameras, alarms, motion sensors, and the like. These devices, termed IoT devices herein, may be accessible through remote computers, servers, and other systems, for example, to control systems or access data. Further IoT devices may include IoT gateways, used to couple other IoT devices to cloud applications.

An example application is a remote temperature gauge, for example, for monitoring outside temperatures from an indoor location. Existing outdoor sensors for IoT devices must be powered using an integrated battery or wired to an indoor powered unit. The batteries in the outdoor units are vulnerable to temperature, water, and other weather conditions. For example, the batteries are often exposed to freezing temperatures where their efficiency can drop significantly. The effective capacity of a typical alkaline battery may drop to below 20% of its normal capacity at around −20° C. Although sensors could be wired, routing of the wire between the indoor base station and the outdoor sensor may involve drilling holes in a window frame or in a wall, or routing the wire through an open window, then closing the window on the wire.

Examples discussed herein describe a split design for an IoT device, which includes a sensor IoT device (SID) having a sensor/actuator system, and a control IoT device (CID) that is designed to provide power and communications to the SID, for example, through a physical obstruction or barrier. The techniques allow for connecting and powering IoT devices deployed in areas where a direct power source is not available. The energy flow could be performed by electromagnetic radiative energy transfer, such as via a light emitting diode (LED), a LASER, or Microwaves, inductive coupling, or resonant inductive coupling. Simultaneously, data may also be transferred between the SID located in a first environment and the CID located in a second environment by means of electromagnetic radiation either by optical coupling, e.g., LED or LASER, or radio-frequency coupling, e.g., microwave, Bluetooth—BLE, NFC, RFID, etc.

As an example, the techniques allow the use of outdoor window sensors, e.g., thermometers, weather stations or other types of low-power sensors, without batteries or wires. It provides both wireless powering of an outdoor window sensor and wireless data transmission. A self-adaptive powering scheme is used to minimize energy losses and automatically choose the required power transmission level. In this example, near-infrared or short-infrared LEDs (or laser diodes) may be used both for the wireless power transmission, for example, combined with photovoltaic cells, and the wireless data transfer, in combination with photodetectors, through the window glass. There is no need for batteries operating outdoors nor any cables being routed between the modules. Installation is made by placing the modules on the opposing surfaces of the window to allow optical coupling with each other. The modules do not need to be calibrated for the window type. Using the powering techniques described herein, the device can automatically choose the optimum operating conditions.

FIG. 1 is a drawing of a cloud computing network, or cloud, in communication with a number of Internet of Things (IoT) devices, at least some of which are communicating with servers. The cloud 100 may represent the Internet, or may be a wide area network, such as a proprietary network for a company. The IoT devices 102 may include any number of different types of devices, grouped in various combinations. For example, a home automation group 106 may include IoT devices 102 throughout a house.

These IoT devices 102 may include motion detectors, light switches, temperature sensors, humidity sensors, and the like. The home automation group 106, or other subgroups, may be in communication with the cloud 100 through a sub-network 108, such as a local area network, wireless local area network, and the like. The IoT devices 102 may use another IoT device 102 as an IoT gateway 118 to communicate with the cloud 100.

Other groups of IoT devices 102 may include stand-alone weather stations 110, alarm systems 112, automated teller machines 114, and alarm panels 116, among many others. Each of these IoT devices 102 may be in communication with other IoT devices 102, with servers 104, or both.

As an example, the home automation group 106 may include an IoT device that is split between a CID and a SID. The CID may be configured to power the SID and obtain a measurement of a sensor from the SID. The CID may then pass the measurement on to a backend server 104, for example, through an IoT gateway 118.

Figure 2:
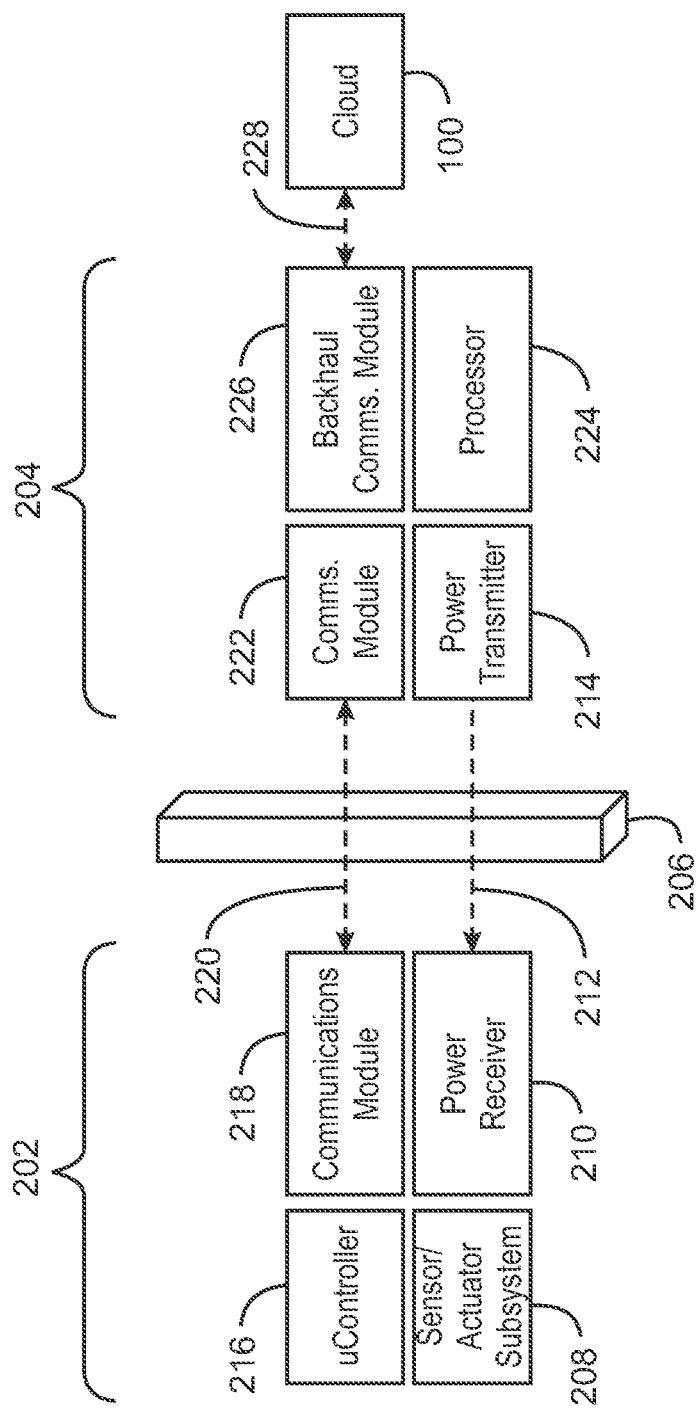
FIG. 2 is a schematic diagram of an example of two IoT devices and communicating through a barrier, wherein a first IoT device is powered by a second IoT device through the barrier.

FIG. 2 is a schematic diagram 200 of an example of two IoT devices 202 and 204 communicating through a barrier 206, wherein a SID 202 is powered by a CID through the barrier 206. The SID 202 includes a sensor/actuator subsystem 208. The sensor/actuator subsystem 208 may include a temperature sensor, among others. A power receiver 210 receives power 212 sent from a power transmitter 214 in the CID 204. A microcontroller processing unit 216 controls the operation of the SID 202. A communications module 218 provides communications 220 with a communications module 222 in the CID 204.

In addition to the power transmitter 214 and communications module 222, the CID 204 includes a processor 224, which directs the operations of the IoT devices 204 and 202, for example, initiating power transmission to the SID 202 and increasing the power in steps until communications are established. A backhaul connectivity module 226 may be included to provide communications 228 with the cloud 100. The components that may be used in each of the IoT devices 202 and 204 are discussed in more detail in FIGS. 3 and 4.

Figure 3:
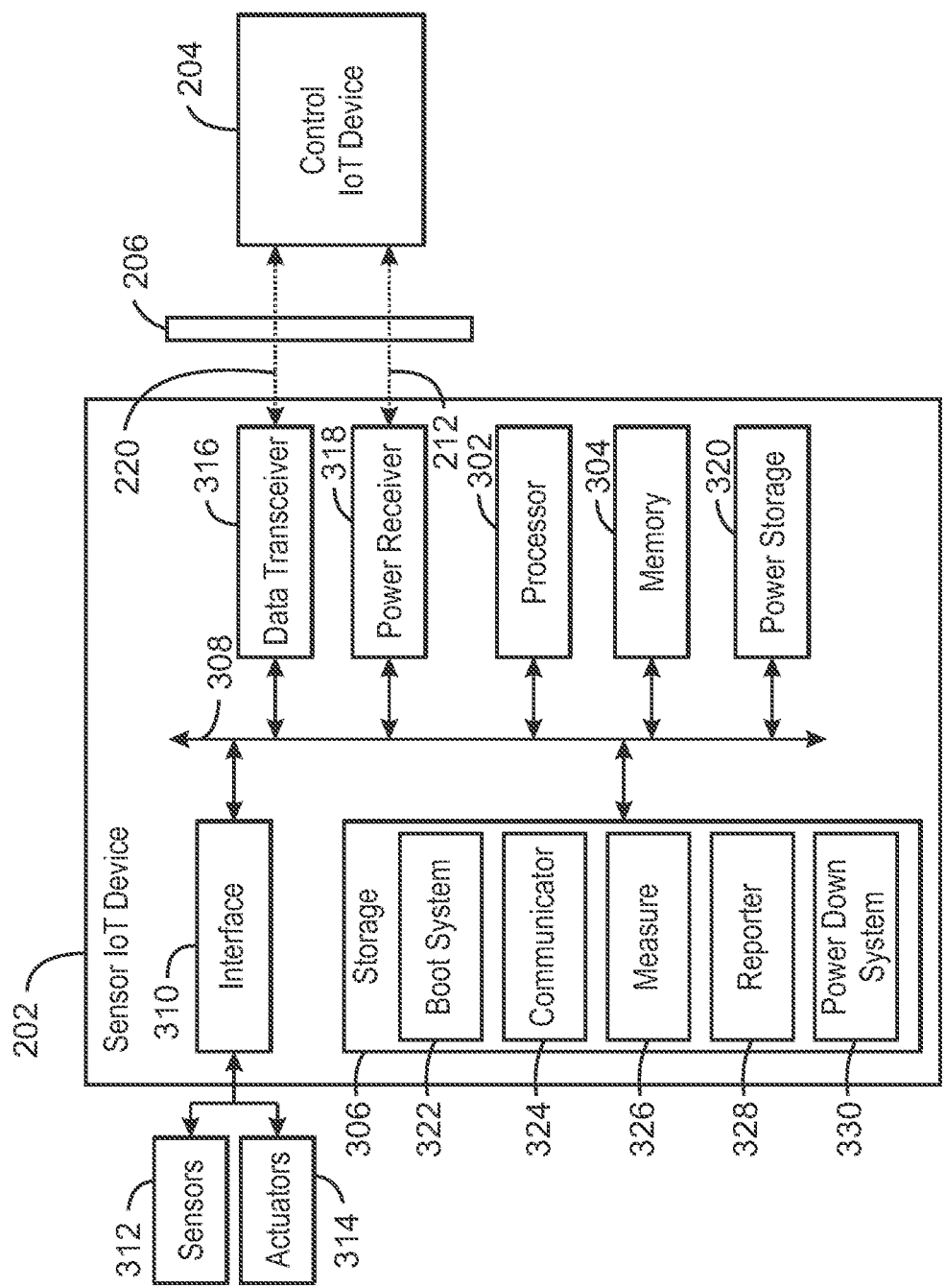
FIG. 3 is a block diagram of components that may be present in an example sensor IoT device (SID) that is powered from and communicates with a control IoT device (CID) located on an opposing surface of a barrier.

FIG. 3 is a block diagram of components that may be present in an example SID 202 that is powered from and communicates with a CID 204 located on an opposing surface of a barrier 206. The SID 202 may include any combinations of the components illustrated. The components may be implemented as ICs, portions thereof, discrete electronic devices, or other modules, logic, hardware, software, firmware, or a combination thereof. In one example, the SID 202 is built as a system on a chip (SoC) to simplify the system, lower the energy demand, and lower the costs of manufacture.

The block diagram of FIG. 3 is intended to show a high level view of components of the SID 202. However, some of the components shown may be omitted, additional components may be present, and different arrangement of the components shown may occur in other implementations. The SID 202 may be a temperature monitoring sensor, a sensor for a remote weather station, an alarm system sensor, or part of any number of other IoT devices 102 as discussed with respect to FIG. 1.

The SID 202 may include a processor 302, which may be a microprocessor, a multi-core processor, a multithreaded processor, an ultra-low voltage processor, an embedded processor, or other known processing element. In some examples, the processor 302 is part of a system on a chip (SoC) in which the processor 302 and other components are formed into a single integrated circuit or a single package.

As an example, the processor 302 may include an Intel® Architecture Core™ based processor, such as a Quark™, an Atom™, an i3, an i5, an i7, or MCU-class processors, or another such processor available from Intel® Corporation, Santa Clara, Calif. Other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an A5/A6 processor from Apple® Inc., a Snapdragon™ processor from Qualcomm® Technologies, Inc., or an OMAP™ processor from Texas Instruments, Inc.

The processor 302 may communicate with a system memory 304. Any number of memory devices may be used to provide for a given amount of system memory. As examples, the memory can include random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA). As noted herein, the memory 304 may be incorporated directly into an SoC configuration.

To provide for persistent storage of information such as data, applications, operating systems and so forth, a mass storage 306 may also couple to the processor 302. The mass storage 306 may be incorporated into an SoC, for example, as part of a non-volatile memory. In some examples, the mass storage may be implemented via a solid state disk drive (SSDD). Further, any number of new technologies may be used for the mass storage 306 in addition to, or instead of, the technologies described, such resistance change memories, phase change memories, holographic memories, or chemical memories, among others. For example, the SID 202 may incorporate the 3D XPOINT memories from Intel® and Micron®.

The components may communicate over a bus 308. The bus 308 may be a proprietary bus, for example, used in an SoC based system. Other bus systems may be used, such as the $I^2C$ interface, the SPI interfaces, and point to point interfaces, among others. In some examples, the bus 308 may include industry standard architecture (ISA), extended ISA (EISA), peripheral component interconnect (PCI), peripheral component interconnect extended (PCIx), PCI express (PCIe), or any number of other technologies.

The bus 308 may couple the processor 302 to an interface 310 that is used to connect external devices. The external devices may include sensors 312, such as temperature sensors, motion sensors, wind speed sensors, barometric pressure sensors, and the like. Other examples of sensors 312 that may be used include sensors for measuring sound, gas concentration, radiation, light, humidity, pressure, air quality and particulates. The sensors 312 may be part of a more complex device, such as a multi-sensor weather station, or any number of other sensing devices. The sensors 312 may be built into the SID 202, for example, temperature and humidity sensors may be constructed as part of an SoC unit. The interface 310 may be used to connect the SID 202 to actuators 314, such as valves used to empty a rain gauge cup, brakes used to slow an anemometer, and the like.

The SID 202 can communicate with a CID 204 through a data transceiver 316. The data transceiver 316 may include a radio, for example, inductively coupled with the CID 204 to provide the communications 220. In one example, the data transceiver 316 includes a light source, such as a light emitting diode (LED), a LASER diode, or the like, optically coupled to a light receiver in the CID 204. A light receiver in the data transceiver 316 may then be coupled to a light source in the CID 204.

A power receiver 318 may be used in the SID 202 to receive power 212 from the CID 204, for example, through the barrier 206. The power receiver 318 may be integrated with a radio communications system, for example, with the data transferred as a high frequency signal overlaid on a lower frequency power signal. In some examples, the power receiver 318 may include a loop antenna that can be inductively coupled to an RF antenna in the CID 204. In systems that use optical coupling, the power receiver 318 may be a photovoltaic cell power by a light source from the CID 204.

In some examples, the SID 202 may include a power storage device 320 to make the shutdown of the device more efficient and to prevent failures due to intermittent power loss. For example, the power storage device 320 may be a super capacitor that is charged by power 212 transferred from the CID 204. The power storage device 320 may be eliminated from some examples, depending on the applications and power demand. For example, a simple temperature and humidity sensor may not need power storage, while a more complex set of weather sensors may use the power to save the measurements and operational status when the power feed from the CID 204 is terminated. Further, the power storage 316 may be used to allow the processor 302 to go into a low energy standby, allowing a faster boot time for measurements.

The mass storage 306 may include a number of modules to direct the processor 302 to implement the functions described herein. These modules may include a boot system 322 that boots the processor 302 in the SID 202 when sufficient power 212 is received over the power receiver 318. Once the system is booted, a communicator 324 may establish communications with the CID 204 through the data transceiver 316. Either automatically, or after receiving a command from the CID 204, a measurer 326 obtains one or more measurements from the sensors 312. A reporter 328 sends the measurement to the CID 204 through the data transceiver 316. Upon loss of power from the CID 204, a power down system 330 may save any relevant measurements or status information before processing terminates.

Figure 4:
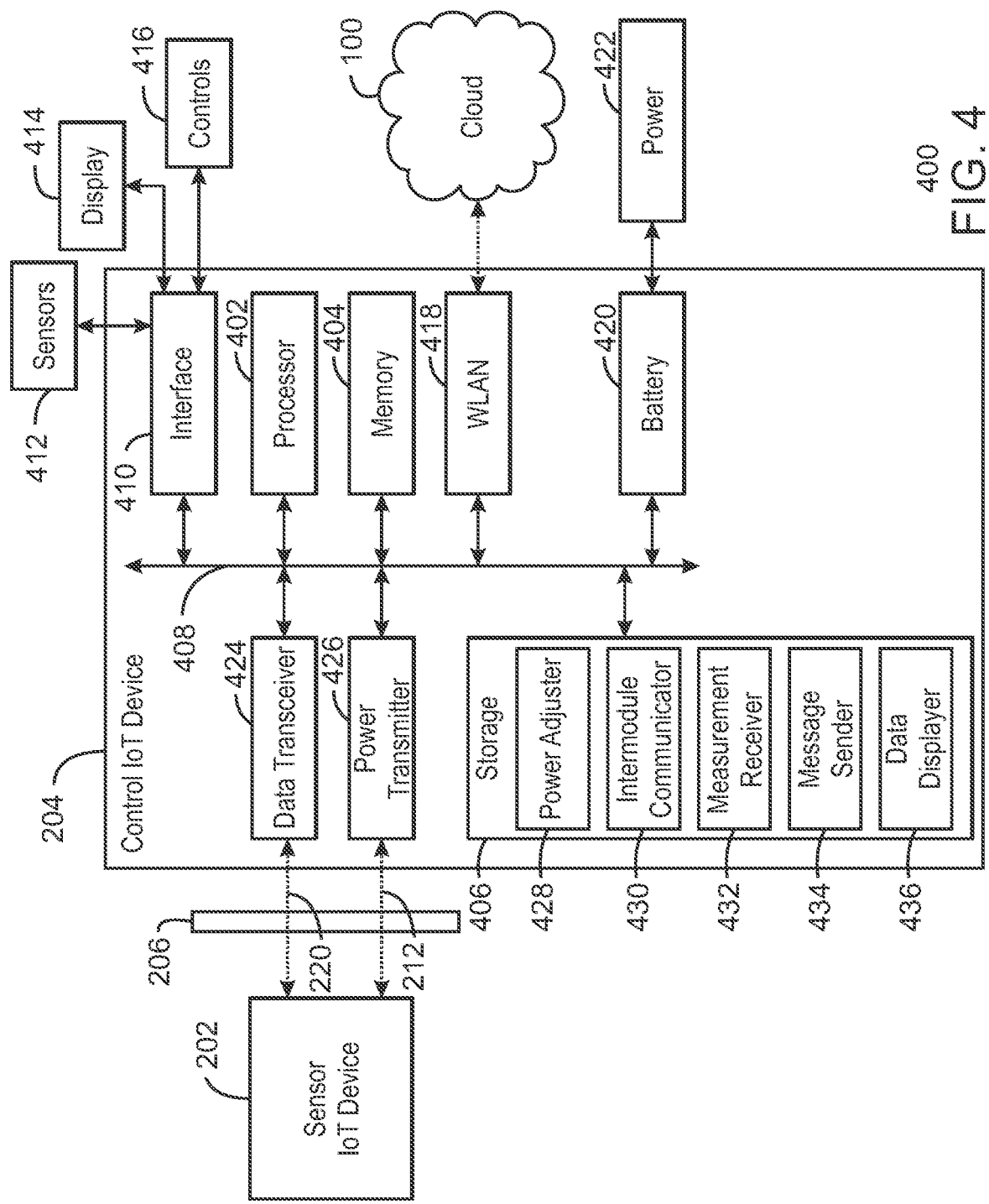
FIG. 4 is a block diagram of components that may be present in an example CID that powers and communicates with a SID located on an opposing surface of a barrier.

FIG. 4 is a block diagram of components that may be present in an example CID 204 that powers and communicates with a SID 202 located on an opposing surface of a barrier 206. The CID 204 may include any combinations of the components illustrated in FIG. 4. The components may be implemented as ICs, portions thereof, discrete electronic devices, or other modules, logic, hardware, software, firmware, or a combination thereof adapted in the CID 204. In one example, the CID 204 is built as a system-on-a-chip (SoC) to simplify the system and lower the costs of manufacture.

The block diagram of FIG. 4 is intended to show a high level view of components of the CID 204. However, some of the components shown may be omitted, additional components may be present, and different arrangement of the components shown may occur in other implementations. The CID 204 may be part of a home weather station, an alarm system transmitter, or part of any number of other IoT devices 102 as discussed with respect to FIG. 1.

The CID 204 may include a processor 402, which may be a microprocessor, a multi-core processor, a multithreaded processor, an ultra-low voltage processor, an embedded processor, or other known processing element. The processor 402 may be a part of a system on a chip (SoC) in which the processor 402 and other components are formed into a single integrated circuit, or a single package. As an example, the processor 402 may include an Intel® Architecture Core™ based processor, such as a Quark™, an Atom™, an i3, an i5, an i7, or MCU-class processors, or another such processor available from Intel® Corporation, Santa Clara, Calif. However, other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an A5/A6 processor from Apple® Inc., a Snapdragon™ processor from Qualcomm® Technologies, Inc., or an OMAP™ processor from Texas Instruments, Inc.

The processor 402 may communicate with a system memory 404. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 406 may also couple to the processor 402. To enable a thinner and lighter system design the mass storage may be implemented via a solid state disk drive (SSDD). However, the mass storage 406 may be implemented using a micro hard disk drive (HDD), a read only memory (ROM), or any number of other devices. Further, any number of new technologies may be used for the mass storage 406 in addition to, or instead of, the technologies described, such resistance change memories, phase change memories, holographic memories, or chemical memories, among others. For example, the CID 204 may incorporate the 3D XPOINT memories from Intel® and Micron®.

The components may communicate over a bus 408. The bus 408 may include any number of technologies, including industry standard architecture (ISA), extended ISA (EISA), peripheral component interconnect (PCI), peripheral component interconnect extended (PCIx), PCI express (PCIe), or any number of other technologies. The bus 408 may be a proprietary bus, for example, used in a SoC based system. Other bus systems may be used, such as the I$^2$C interface, the SPI interfaces, and point to point interfaces, among others.

The bus 408 may couple the processor 402 to an interface 410 that is used to connect external devices. The external devices may include sensors 412, such as temperature sensors, motion sensors, barometric pressure sensors, and the like. The interface 410 may be used to connect the CID 204 to a display 414 to show information, such as sensor readings, alarm information, and the like. A keypad or other controls 416 may be coupled to the interface to enter settings, trigger measurements, or examine measurement history, and the like.

The CID 204 can communicate with a cloud 100 in a variety of manners, including wirelessly. In the example shown in FIG. 4, a WLAN unit 418 may be used to implement Wi-Fi™ communications in accordance with the Institute of Electrical and Electronics Engineers (IEEE) 802.11 standard. Other units may be included for communicating with the cloud, such as a wireless wide area network (WWAN) unit to provide communications by a cellular or other wireless wide area protocols. The CID 204 is not limited to these types of radio transceivers, but may include any number of other radio communications equipment, such as transceivers compatible with the Bluetooth® standard as defined by the Bluetooth® special interest group. For example, the CID 204 may communicate over a wireless personal area network (WPAN) according to the IEEE 802.15.4 standard, among others.

The CID 204 may include a network interface controller to communicate with the cloud 100 through an Ethernet interface. This may include communicating through a small wired or wireless network shared by number of CIDs 204 that communicate with the cloud 100 through an IoT gateway 118, as described with respect to FIG. 1. Further, the CID 204 may be part of an ad-hoc or mesh network in which a number of devices pass communications directly between each other, for example, following the optimized link state routing (OLSR) Protocol, or the better approach to mobile ad-hoc networking (B.A.T.M.A.N.), among others. The mesh network may communicate with the cloud, for example, through the IoT gateway 118.

The CID 204 may be powered by a local power source, such as a battery 420. The local power source may include any number of other units in addition to, or instead of the battery 420, such as a power supply 422 to charge the battery 420, among others.

The CID 204 also includes a data transceiver 424 to implement communications 220 with a SID 202, for example, as described with respect to the data transceiver 316 of FIG. 3. A power transmitter 426, such as an inductively coupled RF power source or a light source, is used to provide power 212 to the SID 202, for example, as described with respect to the power receiver 318 of FIG. 3.

The mass storage 406 may include a number of modules to implement the functions described herein. These modules may include a power adjuster 428 that controls the transmission of power 212 to the SID 202 via the power transmitter 426. An intermodule communicator 430 may determine if communications 220 have been established with the SID 202. If not, the power adjustor 428 may be directed to increase the power in steps until communications 220 are established, e.g., by receiving a signal or message from the SID 202. A measurement receiver 432 may instruct the SID 202 to collect a measurement and receive the measurement from the SID 202. A message sender 434 may compose a data message including, for example, a time stamp and the value of the measurement, and then send the message to another unit, such as a server in the cloud. A data displayer 436 may be used to display the measurements on the display 414 attached to the interface 410.

Figure 5:
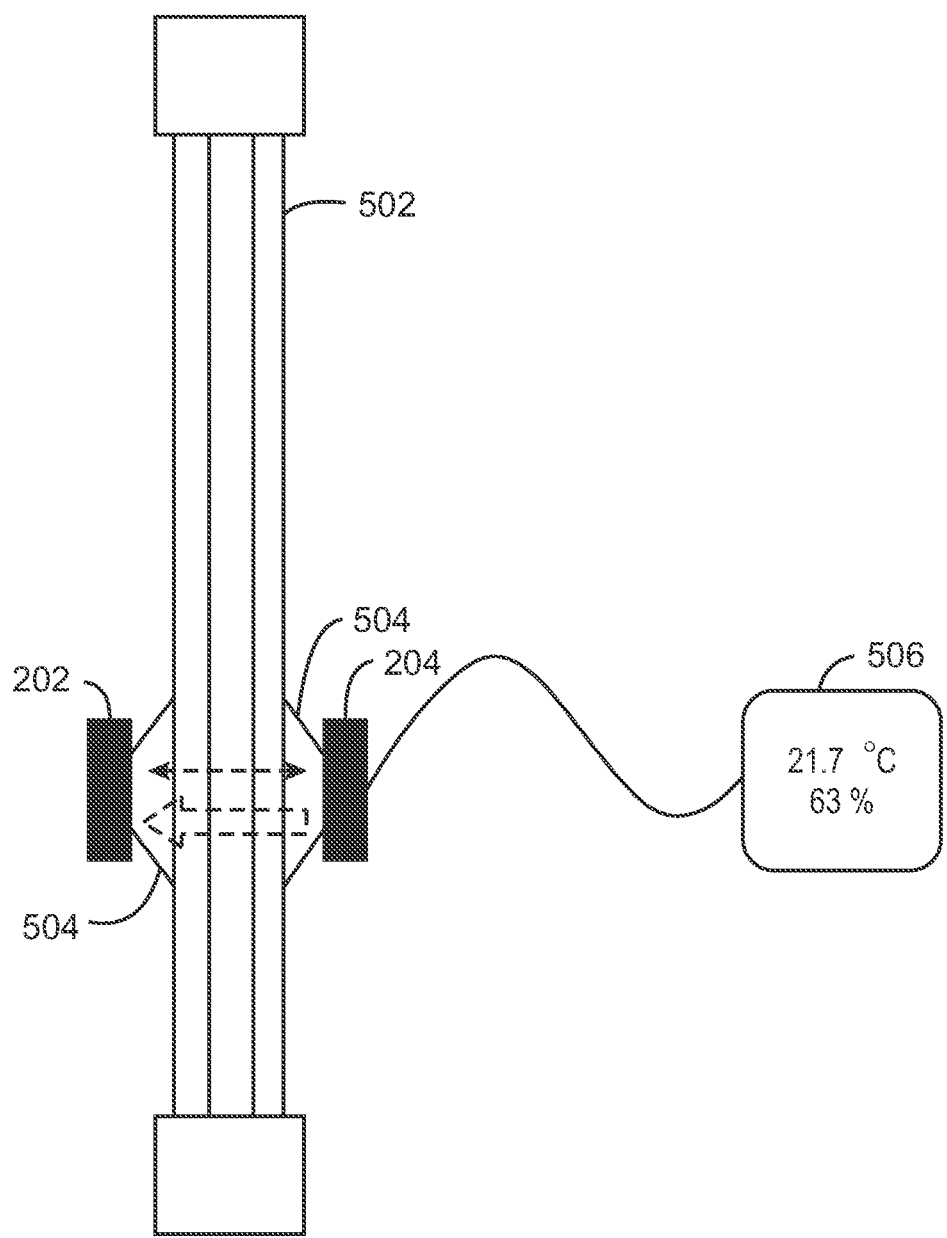
FIG. 5 is a schematic diagram of an example of two IoT devices and exchanging data and power through a window.

FIG. 5 is a schematic diagram of an example of two IoT devices 202 and 204 exchanging data and power through a window 502. Like numbered items are as described with respect to FIG. 2. In this example, suction cups 504 are used to hold the SID 202 and the CID 204 to the window 502. Any number of other devices may be used to hold the IoT devices 202 and 204 in proximity to each other on opposing sides of the window, such as magnets, temporary adhesives, permanent adhesives, and the like.

This example uses inductive coupling for wireless power delivery, for example, with a receiving antenna loop in the SID 202 coupled to a broadcasting antenna loop in the CID 204. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others. As an example, the Qi standard is operation for wireless power delivery up to a distance of 40 mm between the two IoT device 202 and 204. Qi also supports wireless communications operating at 2 kb/s using backscatter modulation. However, this may provide only unidirectional from the SID 202 to the controller IoT device 204. Accordingly, it may be combined with other techniques, such as an optical communications system or other radio technologies, to allow bidirectional communications.

Thus, a short-range inductive wireless power transmission can be combined with a short-range wireless data transfer for an external sensor/actuator. As described herein, the SID 202 may include any number of sensors, such as temperature, sound, gas concentration, radiation, light, humidity, pressure, air quality, and particulate sensors, a multi-sensor weather station or a different type of low-power sensing device. In this example, temperature and humidity sensors in the SID 202 measures the external temperature and humidity. The result are provided to the CID 204, which may present the values on a display 506.

Figure 6:
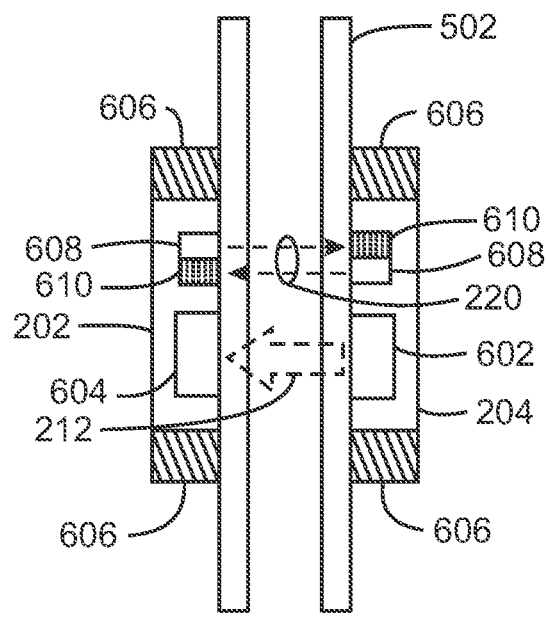
FIG. 6 is a schematic diagram of an example of two IoT devices and communicating through a window using optical coupling.

FIG. 6 is a schematic diagram of an example of two IoT devices 202 and 204 communicating through a window 502 using optical coupling. Like numbered items are as described with respect to FIGS. 2 and 5. This example takes advantage of the transparency of window glass to electromagnetic radiation in the visible (0.4-0.75 μm), near-infrared (NIR 0.75-1.4 μm) and short-infrared (SWIR 1.4-3 μm) range. This makes it possible to transmit both power and data between the two IoT devices 202 and 204.

In the CID 204 a light emitter 602 may send power 220 to the SID 202, which can be converted to electrical power by a photovoltaic cell 604. This may be performed using near-infrared and short-infrared LEDs or LASER diodes as the light emitter 602. Photovoltaic cells 604 based on periodic group III-V compound semiconductors are suitable for this purpose. The photovoltaic cell 604 may achieve power conversion efficiencies approaching 50% and the radiation from the near-infrared and short-infrared LEDs or LASER diodes is invisible.

The spectral transmission of window glass is usually optimized for highest transparency in the visible range, then dipping around the wavelength of 0.7 µm and partly recovering after 1.5 µm. Thus, for the most efficient energy transfer in the near- and short-infrared range, the very edge of the visible spectrum (~700 nm) or beyond the 1.5 µm range may be used.

However, LEDs that may be used as the light emitter 602 typically have external quantum efficiencies below 30%. Further, losses caused by the atmospheric absorption as well as absorption and reflection in the glass of the window panes must be accounted for in determining the power 220 that can be transferred. These losses can easily amount to 50% for a typical double-glazed window at the long-wavelength edge of the visible spectrum. Taking into account the efficiency of the transmitter LED, the losses in transmission through glass and the efficiency of the PV cell, the total energy transfer efficiency of below 10%. Such low levels of the energy transfer efficiency make the techniques a viable solution for powering-up small SIDs 202 such as electronic thermometers, weather stations, etc., that do not need a continuous supply of power.

The bi-directional data transmission may be achieved by using 2 pairs of low-power LEDs 608 and photodiodes 610 operating in the visible, near-infrared or short-infrared range. Magnets 606, such as rare earth magnets, may be used to hold the SID 202 and the CID 204 is position on the opposing surfaces of the window 502. The magnets 606 may be oriented so as to steer the orientation of the IoT devices 202 and 204 into alignment.

Figure 7:
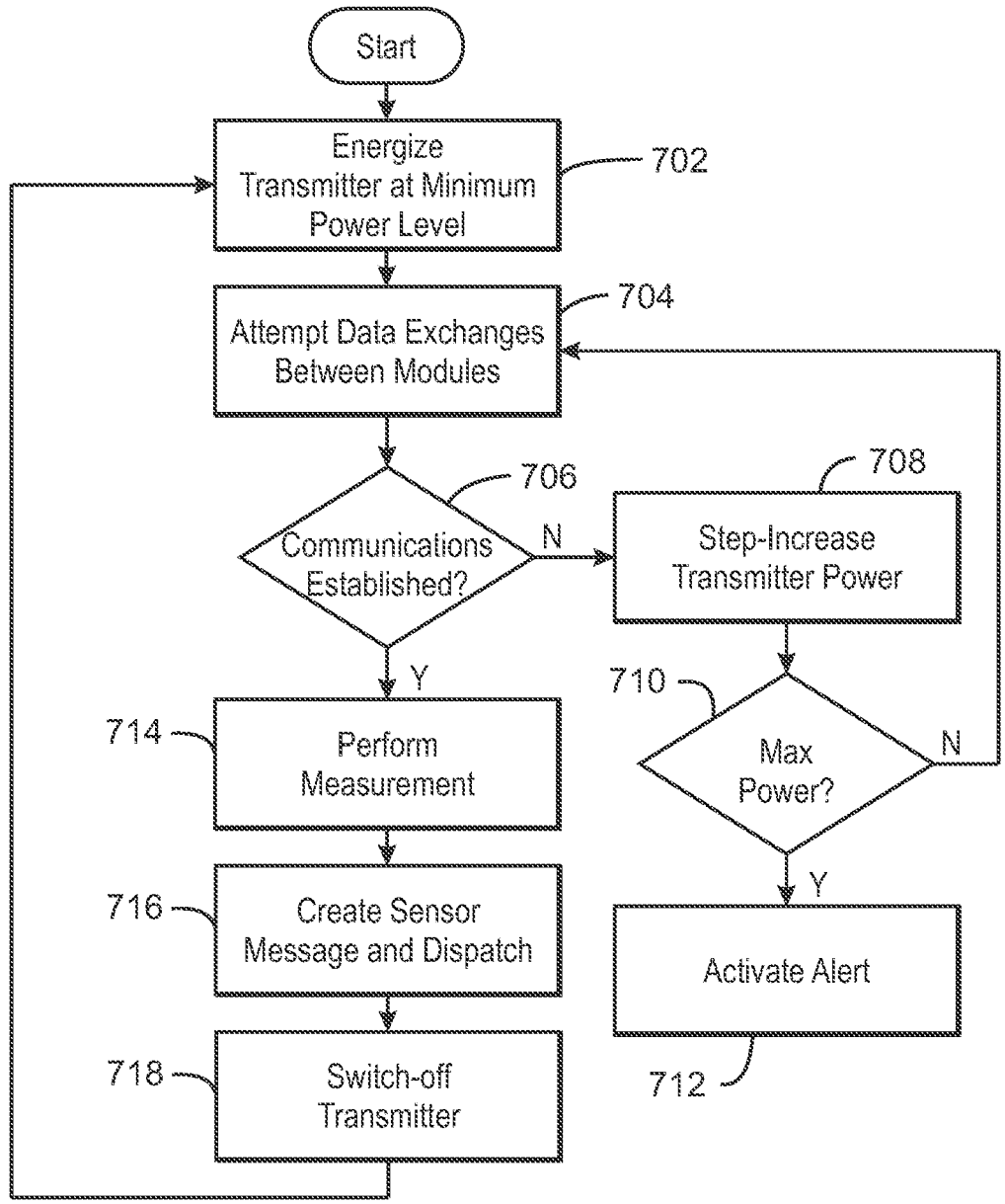
FIG. 7 is a block diagram of an example method for communicating between two IoT devices located on opposite sides of a barrier.

FIG. 7 is a block diagram of an example method 700 for communicating between two IoT devices located on opposite sides of a barrier. To minimize overall energy losses and make the design more practical, a periodic powering scheme may be implemented using the method 700 of FIG. 7.

The method 700 starts at block 702, when the CID energizes the power transmitter at a first level. At block 704, a data exchange between the CID and the SID is attempted. If no communications have been established, as determined at block 706, at block 708, the power transmitter level is stepped up to a next higher level. If it is determined at block 710 that the increased power level would be beyond the maximum power available, at block 712 an alert is activated and the process ends. The alert may be a message on a display, a message sent to the cloud, or both. If the power level after the step increase is not beyond maximum power at block 710, process flow returns to block 704 to attempt the data exchange again.

If, at block 706, it is determined that communications have been established, at block 714 a measurement is performed by the SID. This may include recording a temperature, pressure, or any other reading of a sensor discussed herein. The measurement is transferred to the CID.

At block 716, a message containing the measurement data is created and dispatched to a backend data processing pipeline. This may also include displaying the data at a display local to the CID.

At block 718, the power transmitter is switched-off, thus powering down the sensing unit. If a local power storage, such as a supercapacitor, is in the SID, the stored power may be used to save state information and other data. Further, depending on a standby power draw, the power storage may provide enough energy to keep the unit in a low power standby, allowing a faster start-up at the next measurement cycle.

The method 700 may be repeated at pre-defined intervals, depending on the desired granularity for the data. Apart from the energy savings, the periodic powering scheme enables the device to adapt to various operating conditions. By stepping-up the transmission power until a reliable data transfer is achieved, the device can automatically choose the optimum powering level for any type of windows, such as different types of glass, single, double, or triple glazing, and the like. Further, the system may adapt to other interferences, such as frost, snow, and the like.

In examples that use non-transparent barriers, an inductive or resonant inductive coupling is used instead of the optical coupling as described herein. In such cases the periodic powering scheme will still be operational, but for more limited range of distances between the modules.

For example, a typical inductive wireless power delivery may work only within a distance of a few millimeters (<7 mm) while a resonant inductive power delivery (as in the Qi standard) may not go beyond a few centimeters (<4.5 cm). Optical coupling provides more flexibility in terms of the distance between the modules, but at the cost of low efficiency, and only with an optically transparent obstruction, window, glass door, etc.

Regarding the bi-directional wireless data transmission between the modules, an optical transmission is preferred for transparent obstructions such as windows, due to its simplicity and small form factor. Radio frequency based transmission is used for other types of barriers. For example, an RFID-based communication can cover the range from a few centimeters up to several meters. Accordingly, the maximum allowed thickness of the barrier for this design to work is limited by the wireless power delivery range rather than the wireless data transmission range.

To decrease time spent initializing communications, the energy level may be saved between data collection events and used as a starting point for future data collection events. However, under some conditions it may be that stepping up the energy level may be more practical changing conditions. Accordingly, if a saved starting point is used, it may be one or two steps lower than a previous starting point, for example, if a level 6 of 10 levels was used to establish communications, subsequent data collections may initiate as a level 4, rather than a level 1.

Figure 8:
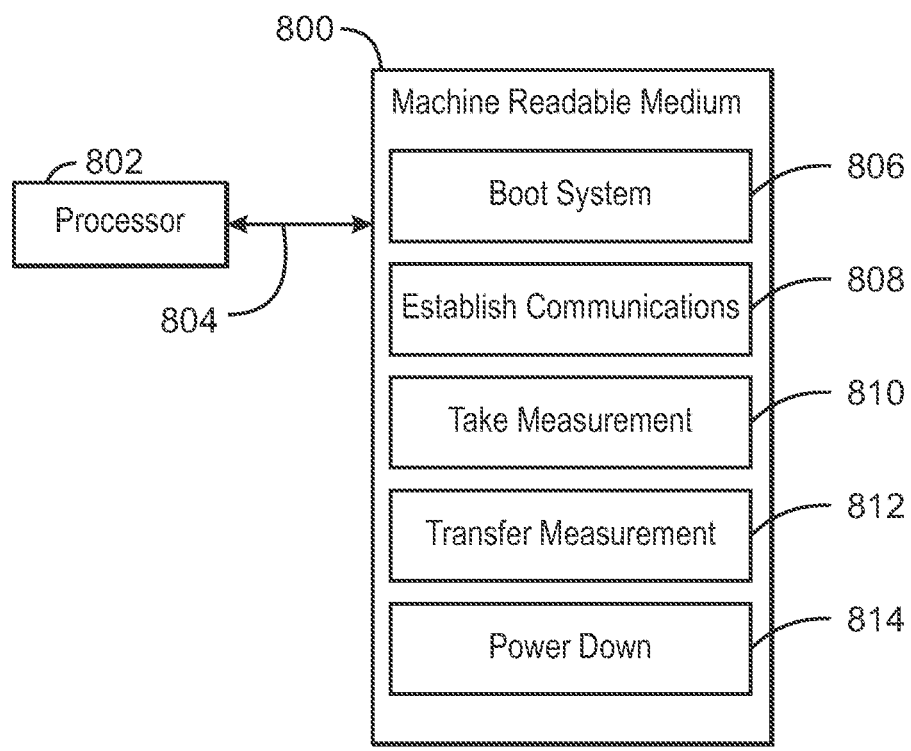
FIG. 8 is a block diagram of a non-transitory, computer readable medium that includes instructions to direct a processor in a SID to be powered from and communicate with a CID located on an opposing surface of a barrier.

FIG. 8 is a block diagram of a non-transitory, computer readable medium 800 that includes instructions to direct a processor 802 in a SID to be powered from and communicate with a CID located on an opposing surface of a barrier. The processor 802 is coupled to the computer readable medium 800 over a bus 804, for example, as described with respect to FIG. 3.

Instructions 806 may be included to boot the processor 802 and prepare for communications when power is first received by the SID. Instructions 808 may be included to direct the processor 802 to establish communications with a CID after booting, for example, by sending a signal or a message to the CID over a communications channel after booting. Instructions 810 may be included to direct the processor 802 to obtain a measurement from a sensor coupled to the SID. Another block of instructions 812 may be included to direct the processor 802 to communicate the measurement to the CID. A block of instructions 814 are included to direct the processor 802 to power down the device once the measurement is transferred. This may be performed as the devices ceases to function when power is removed, or in a controlled fashion, for example, using power from a temporary power storage device.

Figure 9:
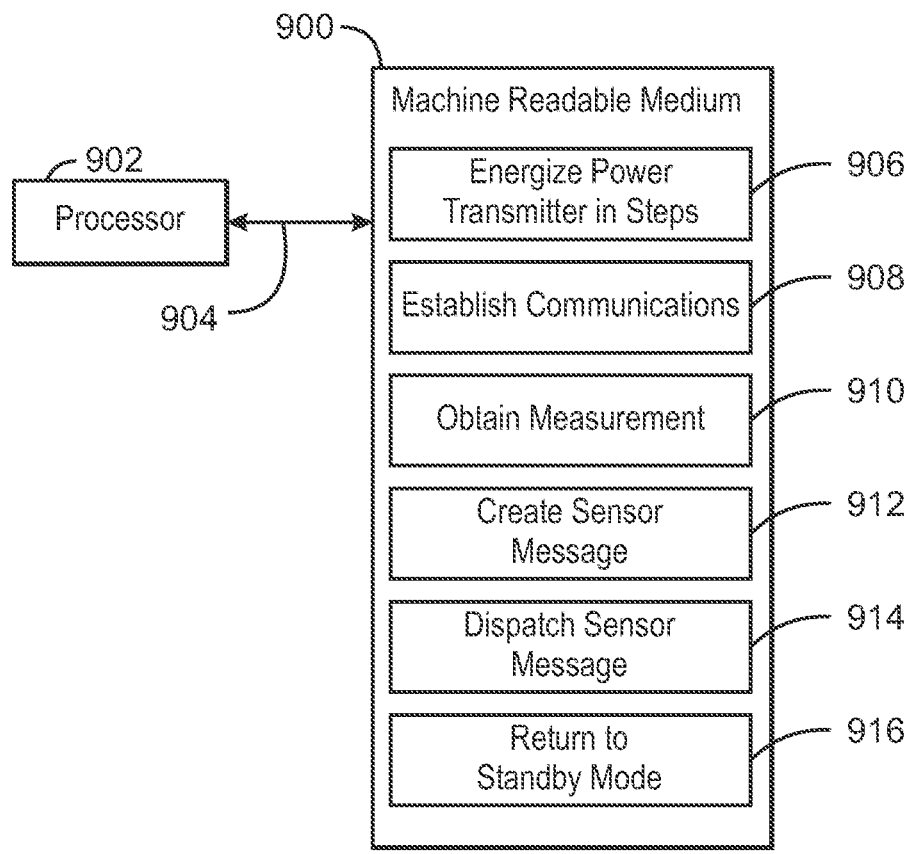
FIG. 9 is a block diagram of a non-transitory, computer readable medium that includes instructions to direct a processor in a CID to power to and communicate with a SID located on an opposing surface of a barrier.

FIG. 9 is a block diagram of a non-transitory, computer readable medium 900 that includes instructions to direct a processor 902 in a CID to power to and communicate with a SID located on an opposing surface of a barrier. The computer readable medium 900 is accessible by the processor over a bus 904, as described with respect to FIG. 4. The computer readable medium 900 includes instructions 906 to direct the processor 902 to energize the transmission of power to the SID in steps. Instructions 908 are included to direct the processor 902 to establish communications with the SID, and, if communications are not established, increase the power transmission to a higher step before trying the communications again.

Instructions 910 are included to direct the processor 902 to obtain a measurement from the SID. Instructions 912 are also included to direct the processor 902 to create a sensor message. Instructions 914 then direct the processor 902 to dispatch the sensor message, for example, to a server, to display the value on a local display, or both. Once the cycle is completed, instructions 916 are included to direct the processor 902 to stop transmitting power to the SID, returning the system to a standby mode to wait before initiating another measurement cycle. In some examples, the instructions 916 may direct the processor 902 to instruct the SID to return to a standby mode, while continuing to transmit power for a longer period to provide power to a temporary power storage device in the SID.

EXAMPLES

Example 1 provides an apparatus that includes a control internet-of-things (IoT) device (CID). The CID includes a power transmitter to power a sensor IoT device (SID) through a barrier and a control data transceiver to communicate with the SID through the barrier. A power adjustor increases power transmission to the SID in steps; and an intermodule communicator determines if communications have been established with the sensor IoT, and, if not, instructs the power adjustor to increase the power transmission to the SID by a step.

Example 2 includes the subject matter of example 1. In this example, the apparatus includes the SID. The SID includes a power receiver to receive power from a CID through the barrier and a sensor data transceiver to communicate with the CID. A boot system boots up the SID when power is received from the CID and a communicator establish communications with the CID.

Example 3 includes the subject matter of either of examples 1 or 2. In this example, the power transmitter includes a radio frequency device inductively coupled to a receiving loop in the power receiver.

Example 4 includes the subject matter of any of examples 1 to 3. In this example, the power transmitter includes a light emitter to transmit power to a photovoltaic cell in the power receiver by optical coupling.

Example 5 includes the subject matter of any of examples 1 to 4. In this example, the control data transceiver includes a light emitting diode and a light detector to communicate with the sensor data transceiver by optical coupling.

Example 6 includes the subject matter of any of examples 1 to 5. In this example, the CID includes a network interface and a message sender to create a sensor message and send the sensor message to a cloud through the network interface.

Example 7 includes the subject matter of any of examples 1 to 6. In this example, the CID includes an interface to a display and a data displayer to display the data on a display coupled to the interface.

Example 8 includes the subject matter of any of examples 1 to 7. In this example, the SID includes a temperature sensor, a humidity sensor, or both.

Example 9 includes the subject matter of any of examples 1 to 8. In this example, the SID includes a motion sensor, a wind speed sensor, a barometric pressure sensor, a sound sensor, a gas concentration sensor, a radiation sensor, a light sensor, a pressure sensor, an air quality sensor, a particulates sensor, or a multi-sensor weather station, or any combinations thereof.

Example 10 includes the subject matter of any of examples 1 to 9. In this example, the SID includes a system on a chip (SoC).

Example 11 includes the subject matter of any of examples 1 to 10. In this example, the SID includes a power storage device to store power transmitted from the CID.

Example 12 provides a method for powering and communicating with a sensor internet of things (IoT) device (SID) across a barrier. The method includes energizing a power transmitter in a control IoT device (CID) at a lowest level, attempting data exchange with a SID across the barrier. If communications are not established, level of the power transmitter is increased in a step wise fashion until communications are established. If maximum power is reached without establishing communications, an alert is activated.

Example 13 includes the subject matter of example 12. In this example, the method includes obtaining a measurement of a sensor from the SID.

Example 14 includes the subject matter of either of examples 12 or 13. In this example, the method includes creating a sensor message that includes the measurement from the sensor, and dispatching the sensor message to a cloud device.

Example 15 includes the subject matter of any of examples 12 to 14. In this example, the method includes displaying the measurement on a display attached to the CID.

Example 16 includes the subject matter of any of examples 12 to 15. In this example, the method includes switching off the power transmitter to power down the SID.

Example 17 includes the subject matter of any of examples 12 to 16. In this example, the method includes repeating a power and communications process at a regular interval.

Example 18 provides a non-transitory machine-readable medium including instructions, which when executed by one or more processors, cause the one or more processors to perform any of the methods of claims 12 to 17.

Example 19 provides an apparatus including means for performing any of the methods of claims 12 to 17.

Example 20 includes a non-transitory, computer readable medium including instructions to direct a processor in a control internet of things (IoT) device (CID) to energize a power transmitter in steps until a communication is detected from a SID and establish communications with the SID. A measurement is obtained from the SID and the power transmitter is deenergized.

Example 21 includes the subject matter of example 20. In this example, the non-transitory, computer readable medium includes instructions to direct the processor in the CID to create a sensor message including the measurement and dispatch the sensor message to a cloud device.

Example 22 includes the subject matter of example 20. In this example, the non-transitory, computer readable medium includes instructions to direct the processor in the CID to present the measurement on a display attached to the CID.

Example 23 provides a non-transitory, computer readable medium that includes instructions to direct a processor in a sensor internet of things (IoT) device (SID) to boot the processor in the SID and establish communications with a control IoT device (CID). The instructions direct the processor to take a measurement from a sensor and transfer the measurement to the CID.

Example 24 includes the subject matter of example 23. In this example, the non-transitory, computer readable medium includes instructions to direct the processor in the SID to power down the device.

Example 25 includes a control internet of things (IoT) device (CID). The CID includes a power transmitter to power a SID through a barrier and a control data transceiver to communicate with the SID through the barrier. A power adjustor increases a power transmission to the SID in steps, and an intermodule communicator determines if communications have been established with the SID. If not, the intermodule communicator instructs the power adjustor to increase the power transmission to the SID by a step.

Example 26 includes the subject matter of example 25. In this example, the power transmitter includes a radio frequency device to transmit power by inductive coupling.

Example 27 includes the subject matter of either of examples 25 or 26. In this example, the power transmitter includes a light emitter to transmit power by optical coupling.

Example 28 includes the subject matter of any of examples 25 to 27. In this example, the control data transceiver includes a light emitting diode and a light detector to communicate by optical coupling.

Example 29 includes the subject matter of any of examples 25 to 28. In this example, the CID includes a network interface and a message sender to create a sensor message and to send the sensor message to a cloud through the network interface.

Example 30 includes the subject matter of any of examples 25 to 29. In this example, the CID includes an interface to a display and a data displayer to display the data on a display coupled to the interface.

Example 31 provides a sensor internet of things (IoT) device (SID). The SID includes a power receiver to receive power from a control IoT device (CID) through a barrier and a sensor data transceiver to communicate with the CID. A boot system boots up the SID when power is received from the CID and a communicator establishes communications with the CID.

Example 32 includes the subject matter of example 31. In this example, the power receiver includes a receiving loop to receive power by inductive coupling.

Example 33 includes the subject matter of either of examples 31 or 32. In this example, the power receiver includes a photovoltaic cell.

Example 34 includes the subject matter of any of examples 31 to 33. In this example, the sensor data transceiver includes a light emitting diode and a light detector to communicate by optical coupling.

Example 35 includes the subject matter of any of examples 31 to 34. In this example, the SID includes a temperature sensor, a humidity sensor, or both.

Example 36 includes the subject matter of any of examples 31 to 35. In this example, the SID includes a motion sensor, a wind speed sensor, a barometric pressure sensor, a sound sensor, a gas concentration sensor, a radiation sensor, a light sensor, a pressure sensor, an air quality sensor, a particulates sensor, or a multi-sensor weather station, or any combinations thereof.

Example 37 includes the subject matter of any of examples 31 to 36. In this example, the SID includes a system on a chip (SoC).

Example 38 includes the subject matter of any of examples 31 to 35. In this example, the SID includes a power storage device to store power transmitted from the CID.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus, comprising a control internet-of-things (IoT) device (CID), comprising:
    a power transmitter to power a sensor IoT device (SID) through a barrier;
    a control data transceiver to communicate with the SID through the barrier;
    a power adjustor to increase a power transmission level to the SID in steps;
    an intermodule communicator to instruct the power adjustor to increase the power transmission level to the SID from a starting power transmitter level by a transmitter power step increase to a power transmitter step level and perform a communications establishment attempt event until communications have been established with the SID, each communications establishment attempt event comprising energizing the power transmitter at the power transmitter step level to power the SID then attempting to establish communications with the SID; and
    a measurement receiver to perform a data collection event by instructing the SID to collect a sensor measurement and receiving the sensor measurement from the SID;
    wherein the power transmitter step level used to establish communications with the SID is saved as the sufficient power transmitter level and is used by the CID to determine the starting power transmitter level for a subsequent data collection event.

2. The apparatus of claim 1, comprising the SID, comprising:
    a power receiver to receive power from the CID through the barrier;
    a sensor data transceiver to communicate with the CID;
    a boot system to boot up the SID when power is received from the CID; and
    a communicator to establish communications with the CID.

3. The apparatus of claim 2, wherein the power transmitter comprises a radio frequency device inductively coupled to a receiving loop in the power receiver.

4. The apparatus of claim 2, wherein the power transmitter comprises a light emitter to transmit power to a photovoltaic cell in the power receiver by optical coupling.

5. The apparatus of claim 2, wherein the control data transceiver comprises a light emitting diode and a light detector to communicate with the sensor data transceiver by optical coupling.

6. The apparatus of claim 2, wherein the SID comprises a temperature sensor, a humidity sensor, or both.

7. The apparatus of claim 2, wherein the SID comprises a motion sensor, a wind speed sensor, a barometric pressure sensor, a sound sensor, a gas concentration sensor, a radiation sensor, a light sensor, a pressure sensor, an air quality sensor, a particulates sensor, or a multi-sensor weather station, or any combinations thereof.

8. The apparatus of claim 2, wherein the SID comprises a system on a chip (SoC).

9. The apparatus of claim 2, wherein the SID comprises a power storage device to store power transmitted from the CID.

10. The apparatus of claim 1, wherein the CID comprises:
    a network interface; and
    a message sender to create a sensor message and to send the sensor message to a cloud through the network interface.

11. The apparatus of claim 1, wherein the CID comprises:
    an interface to a display; and
    a data displayer to display the sensor measurement on the display coupled to the interface.

12. The apparatus of claim 1, wherein the starting power transmitter level for the subsequent data collection event is slightly lower than the power transmitter step level from the communications establishment attempt event.

13. The apparatus of claim 1, wherein the barrier comprises glass.

14. The apparatus of claim 1, wherein the CID and the SID are located on opposing surfaces of the barrier.

15. A method for powering and communicating with a sensor internet of things (IoT) device (SID) across a barrier, comprising:
    periodically performing a data collection event to obtain sensor data from the SID, wherein the data collection event comprises:
    energizing a power transmitter in a control IoT device (CID);
    increasing a level of the power transmitter from a starting power transmitter level in a step wise fashion to a power transmitter step level and perform a communications establishment attempt event until communications are established and activating an alert if maximum power is reached without establishing communications, each communications establishment attempt event comprising energizing the power transmitter at the level of the power transmitter to power the SID then establishing attempting to establish communications with the SID;
    obtaining a measurement of a sensor from the SID at a measurement receiver; and
    saving the power transmitter step level used to establish communications with the SID as the sufficient power transmitter level, wherein the saved sufficient power transmitter level used in the communications establishment attempt event is used by the CID to determine the starting power transmitter level for a subsequent data collection event.

16. The method of claim 15, comprising instructing the SID to collect the measurement of the sensor, wherein obtaining the measurement of the sensor from the SID is responsive to instructing the SID to collect the measurement of the sensor.

17. The method of claim 16, comprising:
    creating a sensor message comprising the measurement from the sensor; and
    dispatching the sensor message to a cloud device.

18. The method of claim 16, comprising displaying the measurement on a display attached to the CID.

19. The method of claim 15, comprising switching off the power transmitter to power down the SID.

20. The method of claim 15, comprising repeating a power and communications process at a regular interval.

21. The method of claim 15, wherein the starting power transmitter level for the subsequent data collection event is slightly lower than the power transmitter step level from the communications establishment attempt event.

22. The method of claim 15, wherein the CID and the SID are located on opposing surfaces of a barrier.

23. The method of claim 22, wherein the barrier comprises glass.

24. A non-transitory, computer readable medium comprising instructions to direct a processor in a control internet of things (IoT) device (CID) to:
periodically perform a data collection event to obtain sensor data from a sensor IoT device (SID), wherein the data collection event comprises to direct the processor to:
energize a power transmitter at a starting power transmitter level and increase a power transmitter level in steps to a power transmitter step level and perform a communications establishment attempt event until a communication is detected from the SID;
establish communications with the SID;
obtain a measurement of the power transmitter level from the SID at a measurement receiver responsive to establishing communications with the SID;
de-energize the power transmitter; and
save the power transmitter step level as the sufficient power transmitter level used in the communications establishment attempt event to establish communications with the SID, wherein the saved sufficient power transmitter level used in the communications establishment attempt event is used by the CID to determine the starting power transmitter level for a subsequent data collection event.

25. The non-transitory, computer readable medium of claim 24, comprising instructions to direct the processor in the CID to:
create a sensor message comprising the measurement; and
dispatch the sensor message to a cloud device.

26. The non-transitory, computer readable medium of claim 24, comprising instructions to direct the processor in the CID to present the measurement on a display attached to the CID.

27. The non-transitory, computer readable medium of claim 24, wherein the starting power transmitter level for the subsequent data collection event is slightly lower than the sufficient power transmitter step level from the communications establishment attempt event.

28. The non-transitory, computer readable medium of claim 24, wherein the CID and the SID are located on opposing surfaces of a barrier.

29. The non-transitory, computer readable medium of claim 28, wherein the barrier comprises glass.

30. A control internet of things (IoT) device (CID), comprising:
a wireless power transmitter to wirelessly power a sensor IoT device (SID) through a barrier;
a control data transceiver to communicate with the SID through the barrier;
a power adjustor to increase a power transmission level to the SID in steps;
an intermodule communicator instruct the power adjustor to increase the power transmission level to the SID from a starting power transmitter level by a transmitter power step increase to a power transmitter step level and perform a communications establishment attempt event until communications have been established with the SID, each communications establishment attempt event comprising energizing the wireless power transmitter at the increased power transmission level to power the SID then attempting to establish communications with the SID; and
a measurement receiver to perform a data collection event by instructing the SID to collect a sensor measurement and receiving the sensor measurement from the SID;
wherein the power transmitter step level used to establish communications with the SID is saved as the sufficient power transmitter level and is used by the CID to determine the starting power transmitter level for a subsequent data collection event.

31. The CID of claim 30, wherein the wireless power transmitter comprises a radio frequency device to transmit power by inductive coupling.

32. The CID of claim 30, wherein the wireless power transmitter comprises a light emitter to transmit power by optical coupling.

33. The CID of claim 30, wherein the starting power transmitter level for the subsequent data collection event is slightly lower than the power transmitter level from the communications establishment attempt event.

34. The CID of claim 30, wherein the barrier comprises glass.

35. The CID of claim 30, wherein the CID and the SID are located on opposing surfaces of the barrier.

\* \* \* \* \*

UNITED STATES PATENT AND TRADEMARK OFFICE
CERTIFICATE OF CORRECTION

PATENT NO. : 11,221,604 B2
APPLICATION NO. : 15/085284
DATED : January 11, 2022
INVENTOR(S) : Wenus et al.

Page 1 of 1

It is certified that error appears in the above-identified patent and that said Letters Patent is hereby corrected as shown below:

On the Title Page

Item (72), in "Inventors", in Column 1, Line 5, delete "Lexlip" and insert --Leixlip-- therefor Item (73), in "Assignee", in Column 1, Line 1, delete "Corporaion," and insert --Corporation,-- therefor In the Claims In Column 17, Line 40, in Claim 27, before "power", delete "sufficient"

In Column 18, Line 38, in Claim 33, after "the", insert --sufficient--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*